US012523350B2

(12) United States Patent
Bushre

(10) Patent No.: US 12,523,350 B2
(45) Date of Patent: Jan. 13, 2026

(54) DIGITAL STITCHING HIGH-RESOLUTION LIGHTING PATTERNS FOR VEHICLE HEADLIGHTS

(71) Applicant: Autosystems, a division of Magna Exteriors Inc, Aurora (CA)

(72) Inventor: Adam Bushre, Saranac, MI (US)

(73) Assignee: Autosystems, a division of Magna Exteriors Inc, Aurora (CA)

( * ) Notice: Subject to any disclaimer, the term of this patent is extended or adjusted under 35 U.S.C. 154(b) by 0 days.

(21) Appl. No.: 18/884,983

(22) Filed: Sep. 13, 2024

(65) Prior Publication Data

US 2025/0155097 A1    May 15, 2025

Related U.S. Application Data

(60) Provisional application No. 63/597,560, filed on Nov. 9, 2023.

(51) Int. Cl.
| | |
|---|---|
| *F21S 41/153* | (2018.01) |
| *F21S 41/32* | (2018.01) |
| *F21S 41/663* | (2018.01) |
| *F21W 102/16* | (2018.01) |
| *F21Y 115/10* | (2016.01) |

(52) U.S. Cl.
CPC ............. *F21S 41/153* (2018.01); *F21S 41/32* (2018.01); *F21S 41/663* (2018.01); *F21W 2102/16* (2018.01); *F21Y 2115/10* (2016.08)

(58) Field of Classification Search
CPC ........ F21S 41/153; F21S 41/32; F21S 41/663; F21W 2102/16; F21W 2102/165; F21W 2102/14; F21W 2102/145; F21W 2102/15; B60Q 2300/52; B60Q 2300/54; B60Q 2300/56; B60Q 1/08; B60Q 1/085; B60Q 1/1415; B60Q 1/1423; B60Q 1/143
See application file for complete search history.

(56) References Cited

U.S. PATENT DOCUMENTS

| | | | |
|---|---|---|---|
| 2013/0169154 A1 * | 7/2013 | Kay ...................... | F21S 41/663 315/81 |
| 2013/0329440 A1 * | 12/2013 | Tsutsumi .............. | F21S 41/153 362/465 |

(Continued)

FOREIGN PATENT DOCUMENTS

| | | | | |
|---|---|---|---|---|
| EP | 3741618 A1 * | 11/2020 | ............. | B60Q 1/143 |
| WO | WO-2022220187 A1 * | 10/2022 | ............. | B60Q 1/085 |

*Primary Examiner* — Erin Kryukova
(74) *Attorney, Agent, or Firm* — Dickinson Wright PLLC

(57) ABSTRACT

A headlight assembly for a vehicle includes a first projector unit and a second projector unit. The first projector unit has a first light source and is configured to project light over a first far-field illumination pattern defining a first boundary edge. The second projector unit has a second light source and is configured to project light over a second far-field illumination pattern defining a second boundary edge. The first light source includes a first plurality of pixel light sources that is controllable to define the first boundary edge, and the second light source includes a second plurality of pixel light sources that is controllable to define the second boundary edge, with the first boundary edge abutting the second boundary edge, thereby producing a seamless transition between the first far-field illumination pattern and the second far-field illumination pattern.

18 Claims, 6 Drawing Sheets

(56) References Cited

U.S. PATENT DOCUMENTS

2017/0008446 A1* 1/2017 Albou .................. B60Q 1/12
2018/0010755 A1* 1/2018 Park .................... F21S 41/155
2022/0128210 A1* 4/2022 Huester ............... F21S 41/663

* cited by examiner

DIGITAL STITCHING HIGH-RESOLUTION LIGHTING PATTERNS FOR VEHICLE HEADLIGHTS

CROSS REFERENCE TO RELATED APPLICATIONS

This U.S. utility patent application claims the benefit of U.S. Provisional Patent Application No. 63/597,560, filed Nov. 9, 2023, the contents of which is incorporated herein by reference in its entirety.

FIELD

The present disclosure relates generally to lighting for motor vehicles. More specifically, the present disclosure relates to headlights for passenger vehicles, such as cars and trucks.

BACKGROUND

Headlight assemblies for vehicles are subject to regulations regarding illumination patterns in order to illuminate a roadway ahead of the vehicle while also minimizing disruption to drivers of other vehicles, including oncoming traffic and vehicles traveling ahead of and in a same direction as the subject vehicle. Several different regulations and standards for headlight illumination may apply in different jurisdictions. Examples of such regulations and standards include ECE Created by the United Nations Economic Commission for Europe, United States Department of Transportation (DOT) for use in the U.S. & Canada, CCC certification for China, and U.S. Society of Automotive Engineers (SAE) standards.

Currently, optical designs use overlapping patterns to create a final light distribution in accordance with the desired illumination pattern. This can include using different optical projectors of differing prescriptions to provide spread as well as the higher intensity requirements in the central portions of most patterns. One projector may produce light central to the pattern with a very narrow spread but high intensity while the other will provide a wider spread with a lower intensity. By having multiple different projection units, each module may require special tools, which can increase cost, especially considering multiple components including lenses, housing, electronics, etc. One module on its own may not be capable of providing both the full spread required to meet the high beam requirements and still provide the highest intensity for a hot spot area of the final light distribution in accordance with the desired illumination pattern.

SUMMARY

The present disclosure provides a headlight assembly for a vehicle. The headlight assembly includes a first projector unit and a second projector unit. The first projector unit has a first light source and is configured to project light over a first far-field illumination pattern defining a first boundary edge. The second projector unit has a second light source and is configured to project light over a second far-field illumination pattern defining a second boundary edge. The first light source includes a first plurality of pixel light sources that is controllable to define the first boundary edge, and the second light source includes a second plurality of pixel light sources that is controllable to define the second boundary edge, with the first boundary edge abutting the second boundary edge, thereby producing a seamless transition between the first far-field illumination pattern and the second far-field illumination pattern.

The present disclosure also provides a method for operating a headlight assembly for a vehicle. The method includes: commanding, by a controller, for a first light source to generate light in accordance with a first far-field illumination pattern defining a first boundary edge; generating, by a first plurality of pixel light sources of the first light source, the light in accordance with the first far-field illumination pattern and defining the first boundary edge; commanding, by the controller, for a second light source to generate light in accordance with a second far-field illumination pattern defining a second boundary edge; and generating, by a second plurality of pixel light sources of the second light source, the light in accordance with the second far-field illumination pattern and defining the second boundary edge, with the second boundary edge abutting the first boundary edge.

These and other aspects of the present disclosure are disclosed in the following detailed description of the embodiments, the appended claims, and the accompanying figures.

BRIEF DESCRIPTION OF THE DRAWINGS

Further details, features and advantages of designs of the invention result from the following description of embodiment examples in reference to the associated drawings.

DETAILED DESCRIPTION

Figure 1:
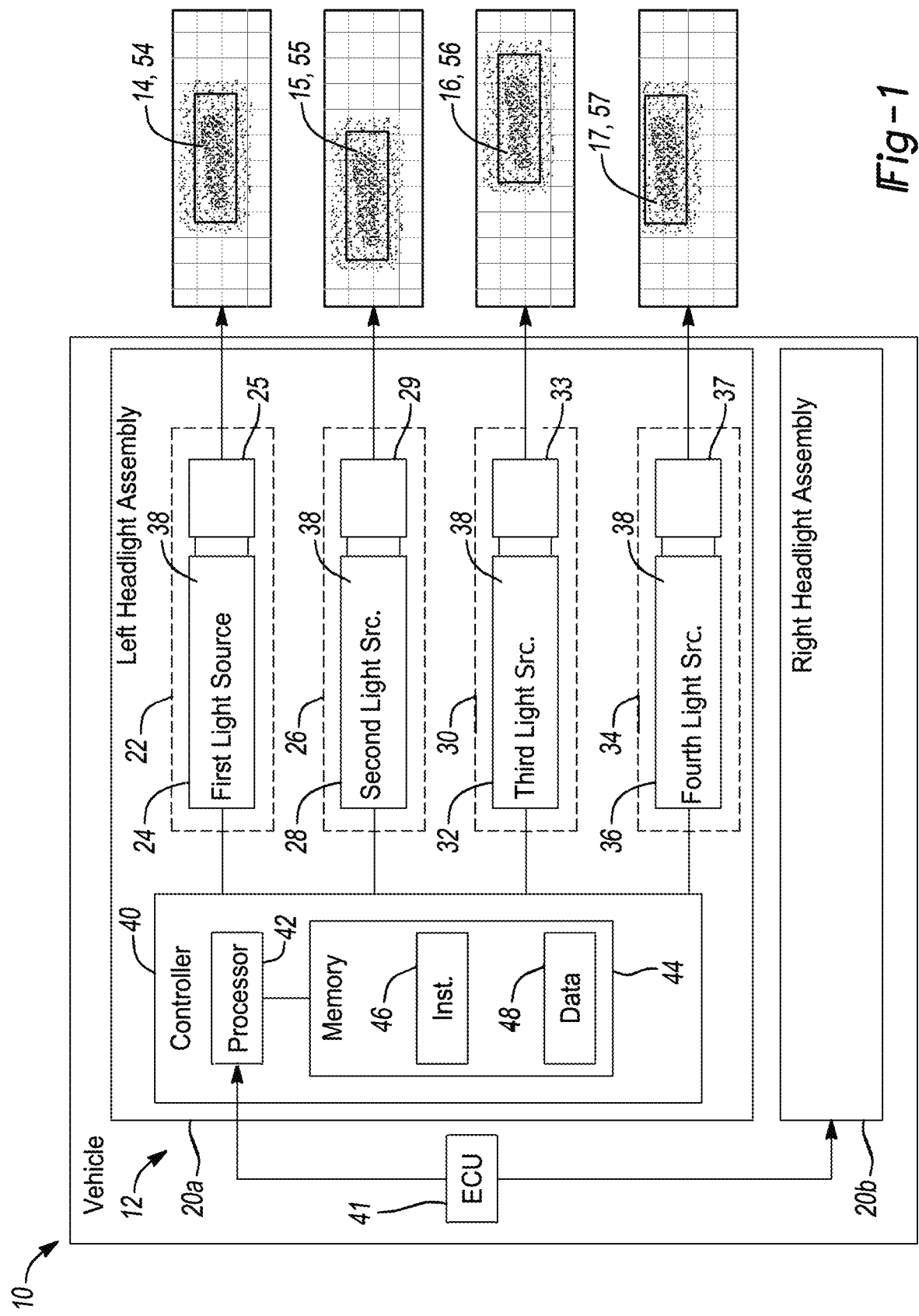
FIG. 1 shows a schematic block diagram of a vehicle with two headlight assemblies, in accordance with an aspect of the present disclosure.

Referring to the drawings, the present invention will be described in detail in view of following embodiments.

It is an objective of the invention of the present disclosure to provide a stitched-together light pattern using two or more high-definition systems, without overlapping pixels.

FIG. 1 shows a schematic block diagram of a vehicle 10 with a lighting system 12, according to an aspect of the present disclosure. The vehicle 10 may be a motor vehicle, such as a passenger car or truck. However, the headlamp assembly of the present disclosure may be applicable to other types of vehicles, such as commercial trucks, busses, trains, etc. The vehicle 10 with the lighting system 12 of the present disclosure may also be referred to as the ego vehicle or the subject vehicle. The lighting system 12 includes a left-side headlight assembly 20*a* and a right-side headlight assembly 20*b*. Each of the headlight assemblies 20*a*, 20*b* may be similar or identical to one-another. In some embodiments, the headlight assemblies 20*a*, 20*b* may include similar or identical internal components and different external components, such as a housing that is configured to fit within the structure on the corresponding side of the vehicle 10.

As shown in FIG. 1, a left-side headlight assembly 20a includes a first projector unit 22, a second projector unit 26, a third projector unit 30, and a fourth projector unit 34. The first projector unit 22 includes a first light source 24 and a first imaging lens assembly 25 overlying the first light source 24 and configured to focus and direct light from the first light source 24 to produce a first far-field illumination pattern 14 within a first illumination field 54. The second projector unit 26 includes a second light source 28 and a second imaging lens assembly 29 overlying the second light source 28 and configured to focus and direct light from the second light source 28 to produce a second far-field illumination pattern 15 within a second illumination field 55. The third projector unit 30 includes a third light source 32 and a third imaging lens assembly 33 overlying the third light source 32 and configured to focus and direct light from the third light source 32 to produce a third far-field illumination pattern 16 within a third illumination field 56. The fourth projector unit 34 includes a fourth light source 36 and a fourth imaging lens assembly 37 overlying the fourth light source 36 and configured to focus and direct light from the fourth light source 36 to produce a fourth far-field illumination pattern 17 within a fourth illumination field 57.

In some embodiments, the first projector unit 22, the second projector unit 26, the third projector unit 30, and/or the fourth projector unit 34 may have identical constructions. For example, they may each include identical hardware for their respective light source 24, 28, 32, 36 and/or for their respective imaging lens assembly 25, 29, 33, 37.

Each of the first light source 24, the second light source 28, the third light source 32, and the fourth light source 36 includes a plurality of pixel light sources 38. The plurality of pixel light sources 38 may include a 2-dimensional array of pixels. For example, the light sources 24, 28, 32, 36 may each include a digital micromirror device (DMD) and/or a diode matrix of light emitting diode (LED) elements. In some embodiments, each of the light sources 24, 28, 32, 36 includes at least 3,000 of the pixel light sources 38. In some embodiments, each of the light sources 24, 28, 32, 36 includes at least 15,000 of the pixel light sources 38. However, the light sources 24, 28, 32, 36 may include any number of pixel light sources 38, with a greater number of pixels providing a greater resolution.

Each of the headlight assemblies 20a, 20b includes a controller 40 in communication with each of the first light source 24, and the second light source 28. The controller 40 may also be called a headlamp smart lighting driver or a headlamp smart LED driver. The controller 40 may be configured to control patterns of light generated by the first projector unit 22 and the second projector unit 26. The controller 40 may provide signals to control a brightness level of each of the pixel light sources 38. For example, the controller 40 may control brightness levels of each of the pixel light sources 38 using on/off signals and with pulse-width modulation (PWM) switching.

The controller 40 includes a processor 42 coupled to a storage memory 44. The storage memory 44 includes instruction storage 46 storing instructions, such as program code for execution by the processor 42. The storage memory 44 also includes data storage 48 for holding data for use by the processor 42.

The vehicle 10 also includes an electronic control unit (ECU) 41, such as a body control module, that is in functional communication with the controllers 40 of each of the headlight assemblies 20a, 20b and configured to communicate one or more signals for controlling operation of the headlight assemblies. For example, the ECU 41 may direct the headlight assemblies 20a, 20b to operate in a high-beam mode or in a low-beam mode. The ECU 41 may provide additional messages or commands to the controllers 40, such as particular regions to illuminate or to dim in order to reduce glare directed toward other traffic.

The far-field illumination patterns 14, 15, 16, 17 shown in FIG. 1 are each full patterns, including each of the light sources 24, 28, 32, 36 with all of their respective pixel light sources 38 illuminated to fill the respective illumination field 54, 55, 56, 57. Such a full pattern may be used for demonstration purposes or for other purposes, such as calibration and alignment. However, during normal operation, the light sources 24, 28, 32, 36 may be operated with some or all of their respective pixel light sources 38 off and/or at a reduced brightness to define a desired low beam illumination pattern and/or high-beam illumination patterns and to cause boundaries between the far-field illumination patterns 14, 15, 16, 17 to have smooth transitions that are not discernable to a viewer.

In some embodiments, one or more of the projector units 22, 26, 30, 34 may be configured as low-beams to project a corresponding one of the far-field illumination patterns 14, 15, 16, 17 with a first intensity, and one or more other ones of the projector units 22, 26, 30, 34 may be configured as low-beams to project a corresponding one of the far-field illumination patterns 14, 15, 16, 17 with a second intensity that is greater than the first intensity. For example, the first projector unit 22, the second projector unit 26, and the third projector unit 30 may each be configured to produce a corresponding far-field illumination pattern 14, 15, 16 with a low-beam intensity, and the fourth projector unit 34 may be configured to produce the corresponding fourth far-field illumination pattern 17 with a high-beam intensity that is greater than the low-beam intensity.

Figure 2:
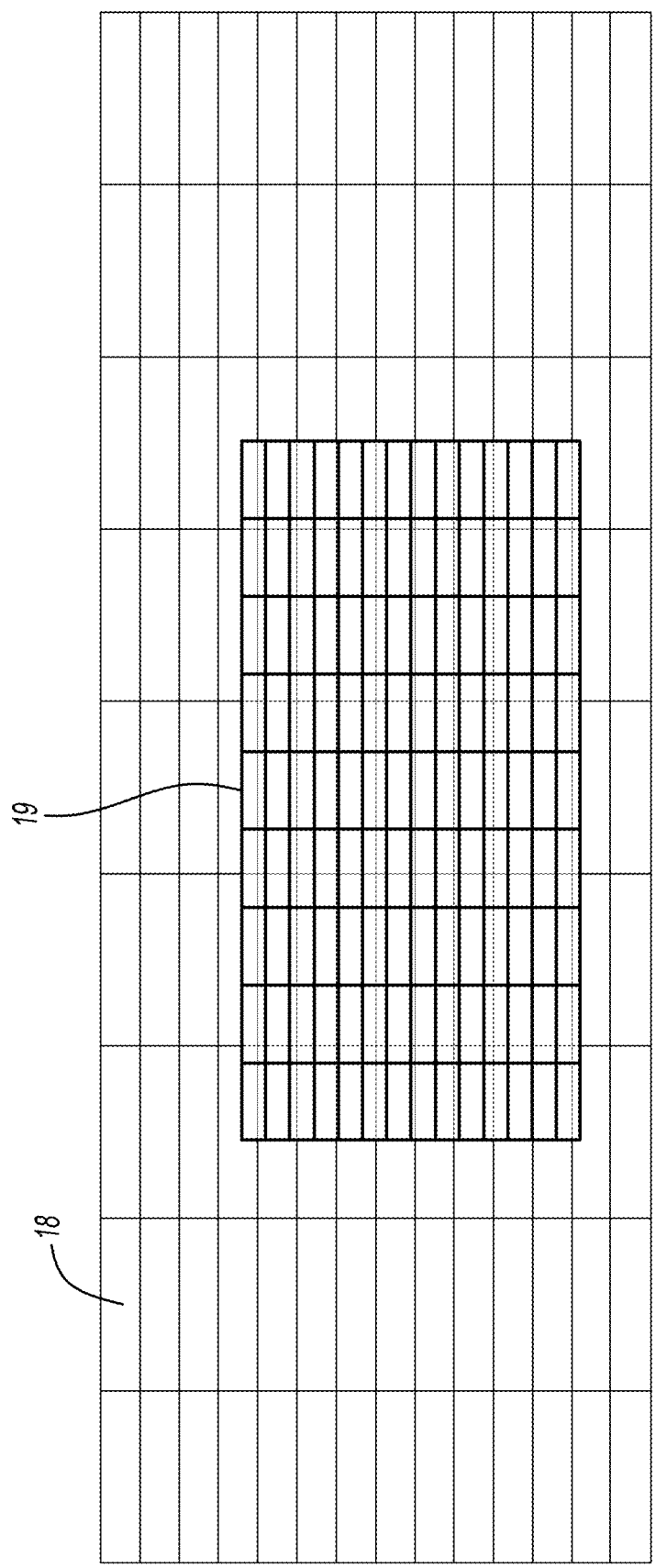
FIG. 2 shows a combined illumination pattern produced by a conventional headlight system.

FIG. 2 shows a combined illumination pattern 18, 19 produced by a high-definition headlight system, with a wide-field illumination pattern 18 and a spot beam pattern 19 completely overlying the wide-field illumination pattern 18 in order to achieve performance targets for beam spread and beam intensity. Each of the wide-field illumination pattern 18 and the spot beam pattern 19 may include a plurality of pixels, but the pixels of the wide-field illumination pattern 18 do not align with pixels of the spot beam pattern 19. Furthermore, the pixels of the wide-field illumination pattern 18 have different sizes and shapes as the pixels of the spot beam pattern 19. By overlapping two different projection field of views there are differing pixel sizes. The pixel sizes then do not light up exactly and make it more difficult to create the software generated desired patterns. This also creates a blending or blurring effect of the pixels since one larger projection would cover more than one smaller projection image.

Figure 3:
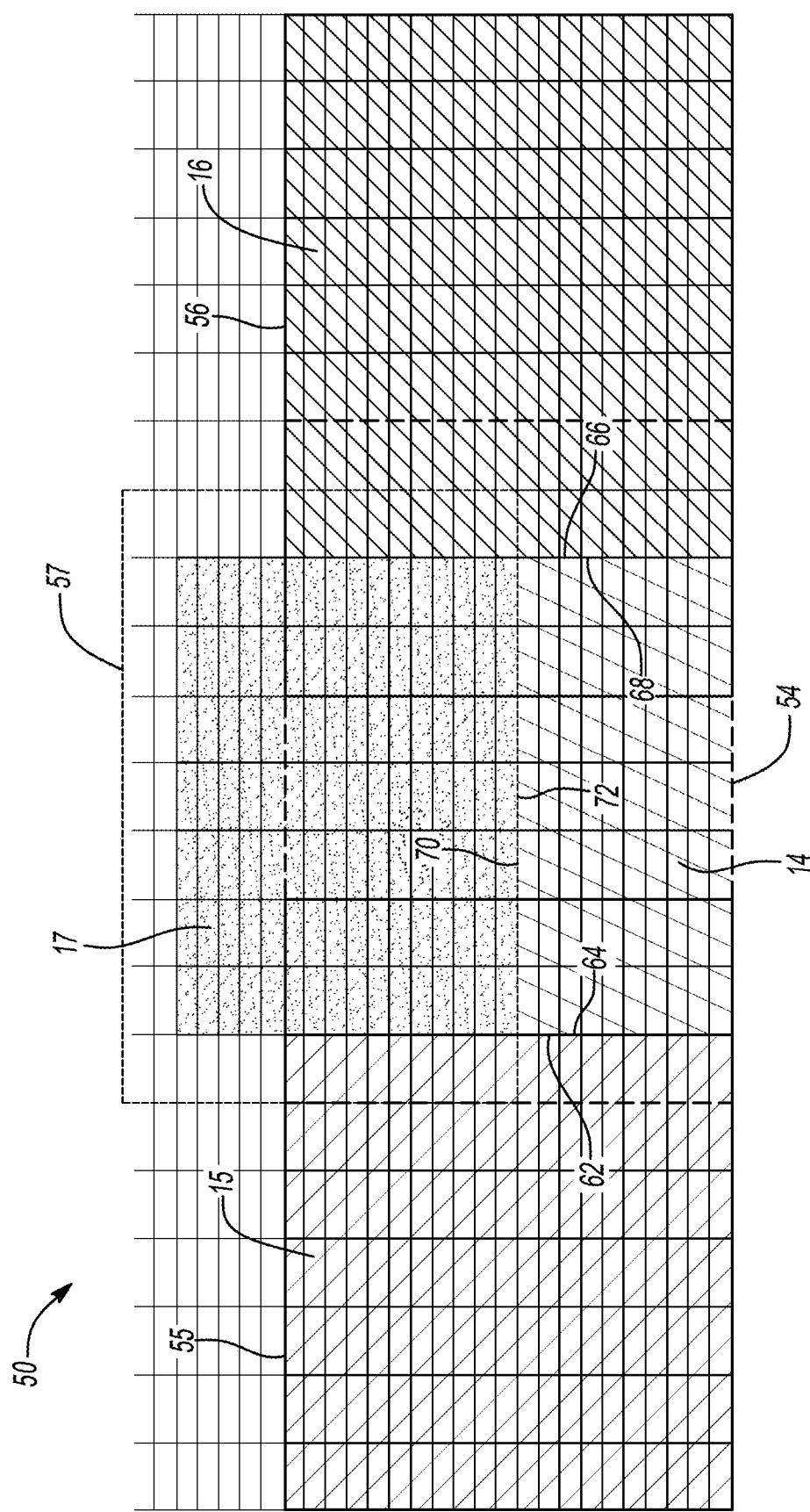
FIG. 3 shows a first combined illumination pattern produced by a headlight assembly of the present disclosure.

FIG. 3 shows a first combined illumination pattern 50 produced by a headlight assembly 20a, 20b of the present disclosure. In some embodiments, the first combined illumination pattern 50 may be produced by a single one of the headlight assemblies 20a, 20b. Alternatively or additionally, the first combined illumination pattern 50 may be produced by the two headlight assemblies 20a, 20b, in combination.

FIG. 3 also shows the first far-field illumination pattern 14 defining a first boundary edge 62, and the second far-field illumination pattern 15 defining a second boundary edge 64 that abuts the first boundary edge 62 along a straight line or a continuous curvature, thereby producing a seamless transition between the first far-field illumination pattern 14 and the second far-field illumination pattern 15. The boundary edges 62, 64 may be produced by controlling the respective light sources 24, 28, to produce the seamless transition and causing the corresponding far-field illumination patterns 14, 15 to originate from a same source. Additionally, FIG. 3 shows pixels of the first far-field illumination pattern 14 and the second far-field illumination pattern 15 each having similar or identical rectangular shapes that are aligned in a common and regular pattern of rows and columns.

FIG. 3 also shows the first far-field illumination pattern 14 defining a third boundary edge 66, and the third far-field illumination pattern 16 defining a fourth boundary edge 68 that abuts the third boundary edge 66 along a straight line or a continuous curvature, thereby producing a seamless transition between the first far-field illumination pattern 14 and the third far-field illumination pattern 16. The first far-field illumination pattern 14 also defines a fifth boundary edge 70, and the fourth far-field illumination pattern 17 defines a sixth boundary edge 72 that abuts the fifth boundary edge 70 along a straight line or a continuous curvature, thereby producing a seamless transition between the first far-field illumination pattern 14 and the fourth far-field illumination pattern 17.

Additionally, FIG. 3 shows pixels of the first far-field illumination pattern 14, the second far-field illumination pattern 15, the third far-field illumination pattern 16, and the fourth far-field illumination pattern 17 each having similar or identical rectangular shapes that are aligned in a common and regular pattern of rows and columns. However, the pixels may have other shapes, such as squares, vertically-aligned rectangles, triangles, rhombuses, etc.

As shown on FIG. 3, two or more of the illumination fields 54, 55, 56, 57 may overlap, but the far-field illumination patterns 14, 15, 16, 17 do not overlap.

Figure 4:
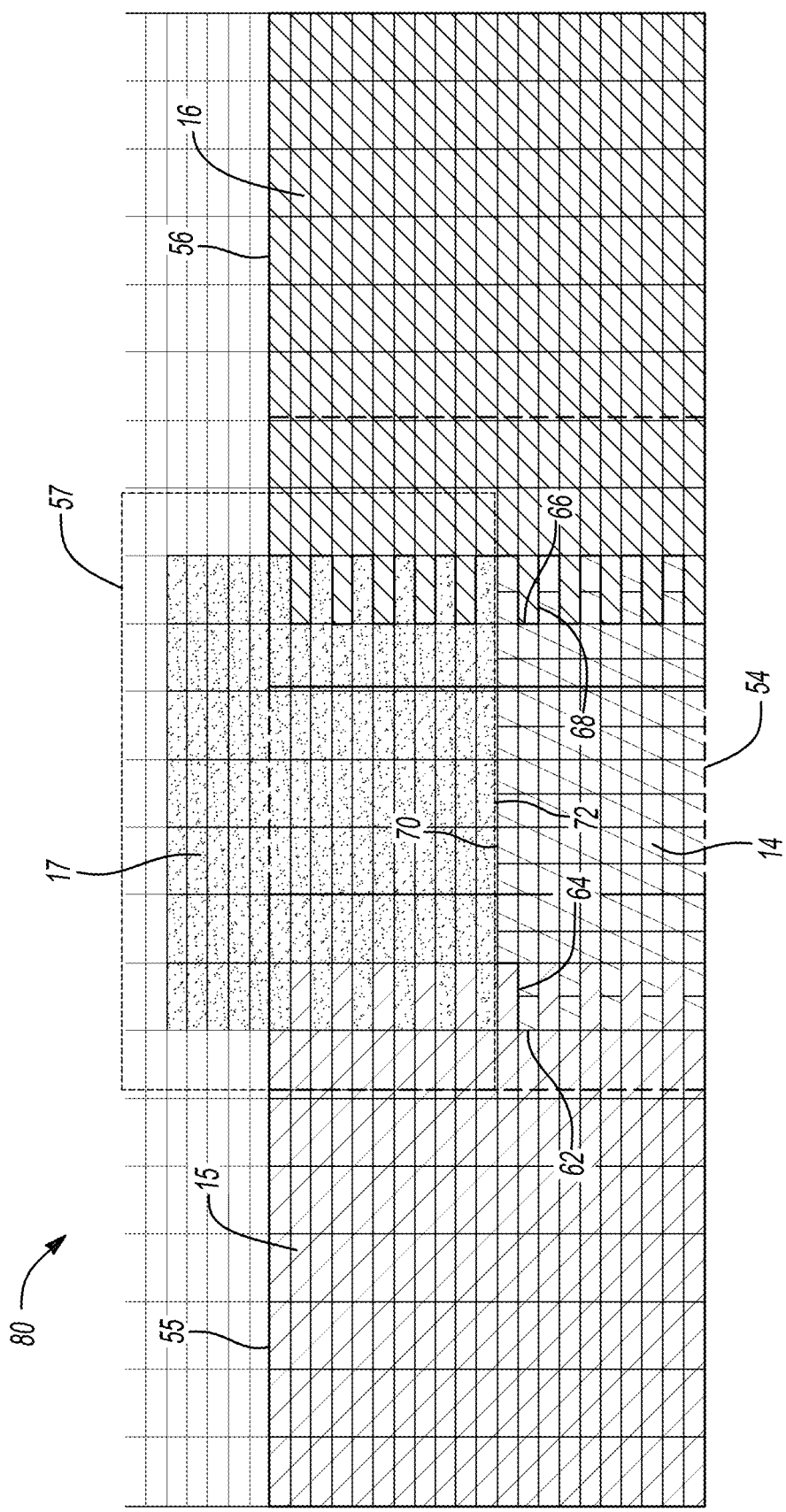
FIG. 4 shows a second combined illumination pattern produced by a headlight assembly of the present disclosure.

In some embodiments, and as shown in FIG. 4, one or more of the boundary edges 62, 64, 66, 68, 70, 72 defines a non-straight line, and adjacent ones of the boundary edges 62, 64, 66, 68, 70, 72 are arranged to interlock together.

For example, as shown in FIG. 4, the first boundary edge 62 and the second boundary edge 64 each includes protrusions at regular-spaced intervals, and the protrusions of the first boundary edge 62 and the second boundary edge 64 interlock together to define an interleaved pattern. In some embodiments, and as shown in FIG. 4, the protrusions are each 1-pixel in length along a length of the corresponding boundary edge. However, the protrusions may be larger. For example, the interleaved pattern may comprise regular or irregular patterns of protrusions, with each of the protrusions including one or more pixels.

FIG. 4 also shows the first illumination field 54 with constituent pixels that are each one-half the size of the pixels within other ones of the illumination fields 55, 56, 57. This is one example to show different sized pixels within the illumination fields 54, 55, 56, 57, with each pixel of one of the illumination fields 54, 55, 56, 57 having a size and shape corresponding to a whole number of pixels of another one of the illumination fields 54, 55, 56, 57. However, other arrangements and sizes of the pixels may be used with the systems and methods of the present disclosure.

The present disclosure provides a headlight assembly having two or more projector units. Each of the projector units would produce the same size emitted pixel images into the far field. The pixels may be turned on or off as if to stitch together the edges of the patterns coming from each projector to produce a seamless transition. The intensities and locations of each pixel projected into the pattern may be controlled such that a viewer would not be able to tell which pixel segment was coming from which projector when viewed. Patterns of the pixels in far-field patterns may include a straight line grid or an interleaved grid, like bricks in a wall. The headlight assembly of the present disclosure may include no overlapping of patterns, and thus no blurring of pixels.

Figure 5:
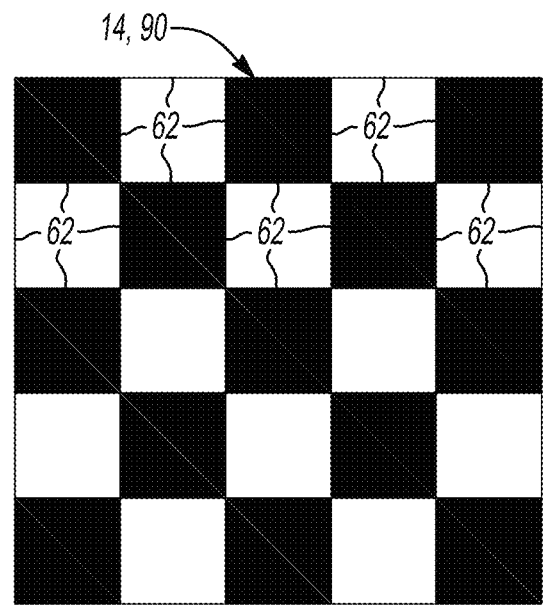
FIG. 5 shows a first checkerboard pattern of the first illumination pattern.
Figure 6:
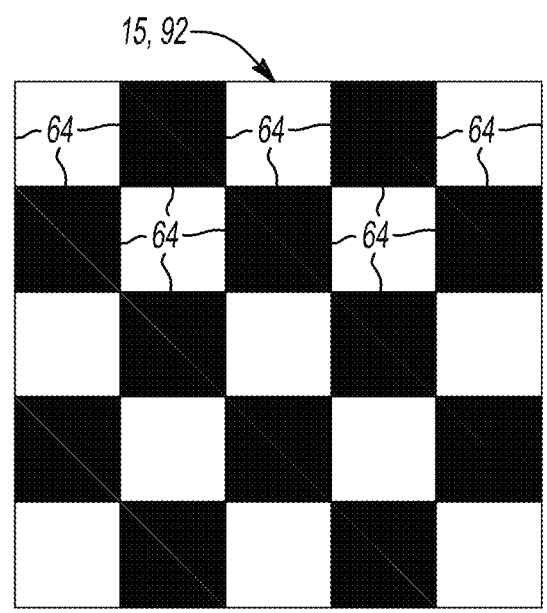
FIG. 6 shows a second checkerboard pattern of the second illumination pattern.

FIG. 5 shows a first checkerboard pattern 90 of the first far-field illumination pattern 14, and FIG. 6 shows a second checkerboard pattern 92 of the second far-field illumination pattern 15. The first checkerboard pattern 90 includes several separate illuminated squares, each bounded along four sides by the first boundary edge 62. The second checkerboard pattern 92 includes several separate illuminated squares, each bounded along four sides by the second boundary edge 64. The checkerboard patterns 90, 92 have opposite bright squares and may be overlaid with one another, and with the first boundary edges 62 each abutting a corresponding one of the second boundary edges 64, to define a full-field illumination. Such full-field illumination may provide for full intensity illumination using two of the projector units 22, 26 with an intensity greater than any one of the projector units 22, 26, 30, 34 can provide, and with the capability to operate at a reduced intensity across a full width and height (but in a reduced intensity mode), in case either of the two projector units 22, 26 is inoperable. It should be appreciated that the checkerboard patterns 90, 92, are merely an example to show how the boundary edges the boundary edges 62, 64, 66, 68, 70, 72 may take complex shapes and/or define closed surfaces.

Figure 7:
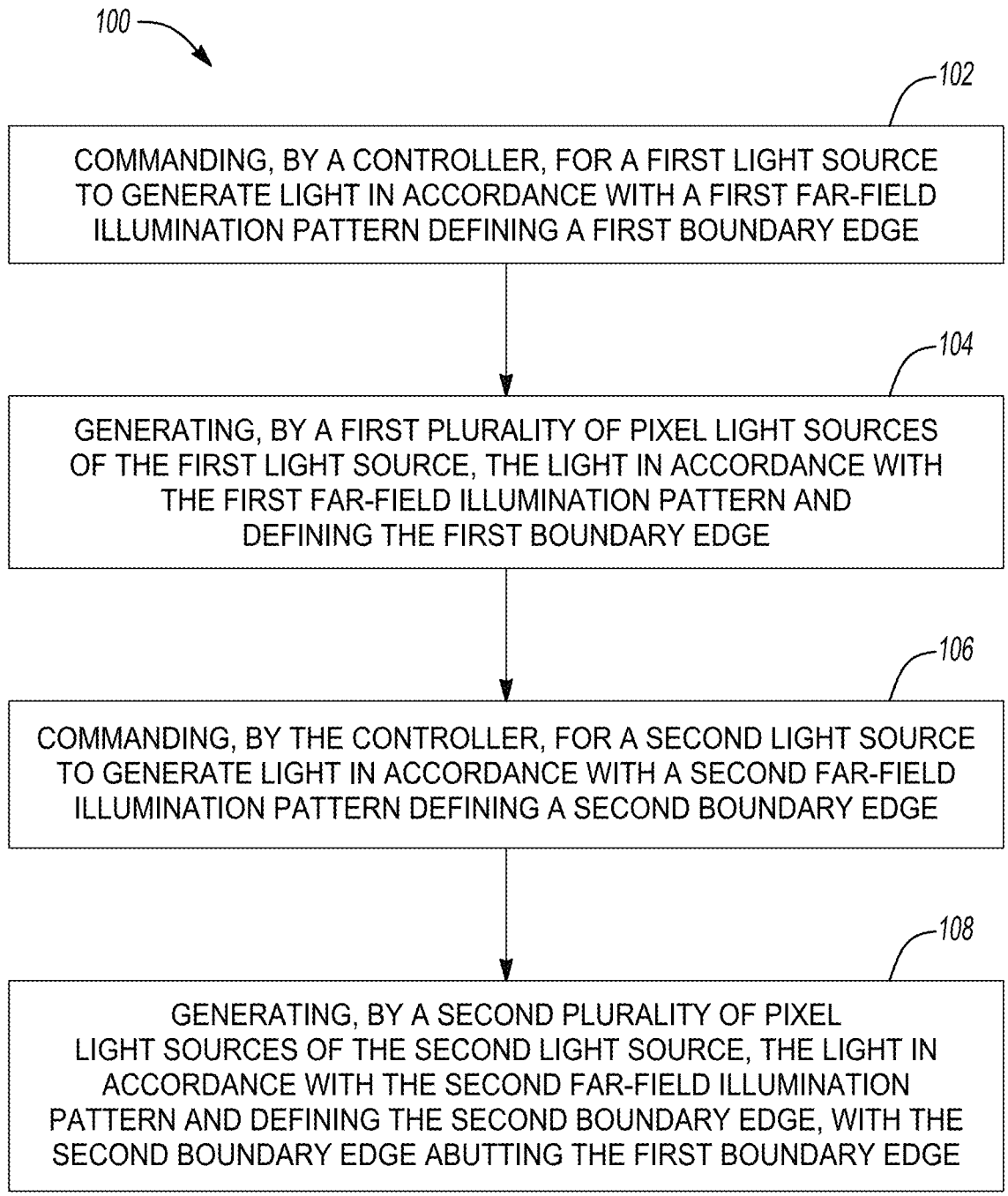
FIG. 7 shows a flow chart listing steps in a method for operating a headlight assembly for a vehicle, in accordance with an aspect of the present disclosure.

A method 100 for operating a headlight assembly for a vehicle is shown in the flow chart of FIG. 7. The method 100 can be performed by the lighting system 12 of the present disclosure. As can be appreciated in light of the disclosure, the order of operation within the method is not limited to the sequential execution as illustrated in FIG. 7, but may be performed in one or more varying orders as applicable and in accordance with the present disclosure.

The method 100 includes commanding, at step 102 and by a controller, for a first light source to generate light in accordance with a first far-field illumination pattern defining a first boundary edge. For example, the processor 42 of the controller 40 may send a command to the first projector unit 22 to cause the first light source 24 to generate light in accordance with the first far-field illumination pattern 14.

The method 100 also includes generating at step 104, and by a first plurality of pixel light sources of the first light source, the light in accordance with the first far-field illumination pattern and defining the first boundary edge For example, the first plurality of pixel light sources 38 of the first light source 24 may each illuminate at a commanded brightness level to generate the first far-field illumination pattern 14, and defining the first boundary edge 62.

The method 100 also includes commanding at step 106, by the controller, for a second light source to generate light in accordance with a second far-field illumination pattern defining a second boundary edge. For example, the processor 42 of the controller 40 may send a command to the second projector unit 26 to cause the second light source 28 to generate light in accordance with the second far-field illumination pattern 15.

The method 100 also includes generating at step 108, and by a second plurality of pixel light sources of the second light source, the light in accordance with the second far-field illumination pattern and defining the second boundary edge, with the second boundary edge abutting the first boundary edge. For example, the second plurality of pixel light sources 38 of the second light source 28 may each illuminate at a commanded brightness level to generate the second far-field illumination pattern 15, and defining the second boundary edge 64, which abuts the first boundary edge 62 of the first far-field illumination pattern 14.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A headlight assembly for a vehicle, comprising:
    a first projector unit having a first light source and configured to project light over a first far-field illumination pattern defining a first boundary edge; and
    a second projector unit having a second light source and configured to project light over a second far-field illumination pattern defining a second boundary edge,
    wherein the first light source includes a first plurality of pixel light sources that is controllable to define the first boundary edge, and the second light source includes a second plurality of pixel light sources that is controllable to define the second boundary edge, with the first boundary edge abutting the second boundary edge, thereby producing a seamless transition between the first far-field illumination pattern and the second far-field illumination pattern, and
    wherein each of the first boundary edge and the second boundary edge defines a non-straight line, and wherein the non-straight lines of the first boundary edge and the second boundary edge are arranged to interlock together.

2. The headlight assembly of claim 1, wherein each of the first light source and the second light source includes a digital micromirror device (DMD) defining the plurality of pixel light sources.

3. The headlight assembly of claim 1, wherein each of the first light source and the second light source includes a diode matrix of light emitting diode (LED) elements defining the plurality of pixel light sources.

4. The headlight assembly of claim 1, wherein at least one of the first plurality of pixel light sources or the second plurality of light sources includes at least 3,000 of the pixel light sources.

5. The headlight assembly of claim 1, wherein at least one of the first plurality of pixel light sources or the second plurality of light sources includes at least 15,000 of the pixel light sources.

6. The headlight assembly of claim 1, wherein each of the first far-field illumination pattern and the second far-field illumination pattern includes a plurality of pixels, and
    wherein each pixel of the first far-field illumination pattern has a size corresponding to a whole number of the pixels of the second far-field illumination pattern.

7. The headlight assembly of claim 6, wherein each pixel of the first far-field illumination pattern has a same size and shape as the pixels of the second far-field illumination pattern.

8. The headlight assembly of claim 1, wherein the non-straight lines of each of the first boundary edge and the second boundary edge includes protrusions at regular-spaced intervals, and
    wherein the protrusions of the first boundary edge and the second boundary edge interlock together to define an interleaved pattern.

9. The headlight assembly of claim 8, wherein the protrusions are each 1-pixel in length along a length of the first boundary edge.

10. The headlight assembly of claim 1, wherein the first projector unit is configured as a low-beam to project the first far-field illumination pattern with a first intensity, and the second projector unit is configured as a high-beam to project the second far-field illumination pattern with a second intensity that is greater than the first intensity.

11. The headlight assembly of claim 1, further including:
    a third projector unit having a third light source including a third plurality of pixel light sources and configured to project light over a third far-field illumination pattern defining a third boundary edge;
    wherein the first projector unit is further configured to project light over the first far-field illumination pattern defining a fourth boundary edge, and
    wherein the first light source and the third light source are operable to cause the third boundary edge to abut the fourth boundary edge to produce a seamless transition between the first far-field illumination pattern and the third far-field illumination pattern.

12. The headlight assembly of claim 1, further including:

a fourth projector unit having a fourth light source including a fourth plurality of pixel light sources and configured to project light over a fourth far-field illumination pattern defining a fifth boundary edge;

wherein the first projector unit is further configured to project light over the first far-field illumination pattern defining a sixth boundary edge, and wherein the first light source and the fourth light source are operable to cause the fifth boundary edge to abut the sixth boundary edge to produce a seamless transition between the first far-field illumination pattern and the fourth far-field illumination pattern.

13. A method for operating a headlight assembly for a vehicle, comprising:

commanding, by a controller, for a first light source to generate light in accordance with a first far-field illumination pattern defining a first boundary edge;

generating, by a first plurality of pixel light sources of the first light source, the light in accordance with the first far-field illumination pattern and defining the first boundary edge;

commanding, by the controller, for a second light source to generate light in accordance with a second far-field illumination pattern defining a second boundary edge; and generating, by a second plurality of pixel light sources of the second light source, the light in accordance with the second far-field illumination pattern and defining the second boundary edge, with the second boundary edge abutting the first boundary edge, wherein each of the first boundary edge and the second boundary edge defines a non-straight line, and wherein the non-straight lines of the first boundary edge and the second boundary edge are arranged to interlock together.

14. The method of claim 13, wherein each of the first light source and the second light source includes a digital micromirror device (DMD) defining the plurality of pixel light sources.

15. The method of claim 13, wherein each of the first light source and the second light source includes a diode matrix of light emitting diode (LED) elements defining the plurality of pixel light sources.

16. The method of claim 13, wherein at least one of the first plurality of pixel light sources or the second plurality of light sources includes at least 3,000 of the pixel light sources.

17. The method of claim 13, wherein at least one of the first plurality of pixel light sources or the second plurality of light sources includes a plurality of pixels, and wherein each pixel of the first far-field illumination pattern has a size corresponding to a whole number of the pixels of the second far-field illumination pattern.

18. The method of claim 17, wherein each pixel of the first far-field illumination pattern has a same size and shape as the pixels of the second far-field illumination pattern.

* * * * *